2,871,283

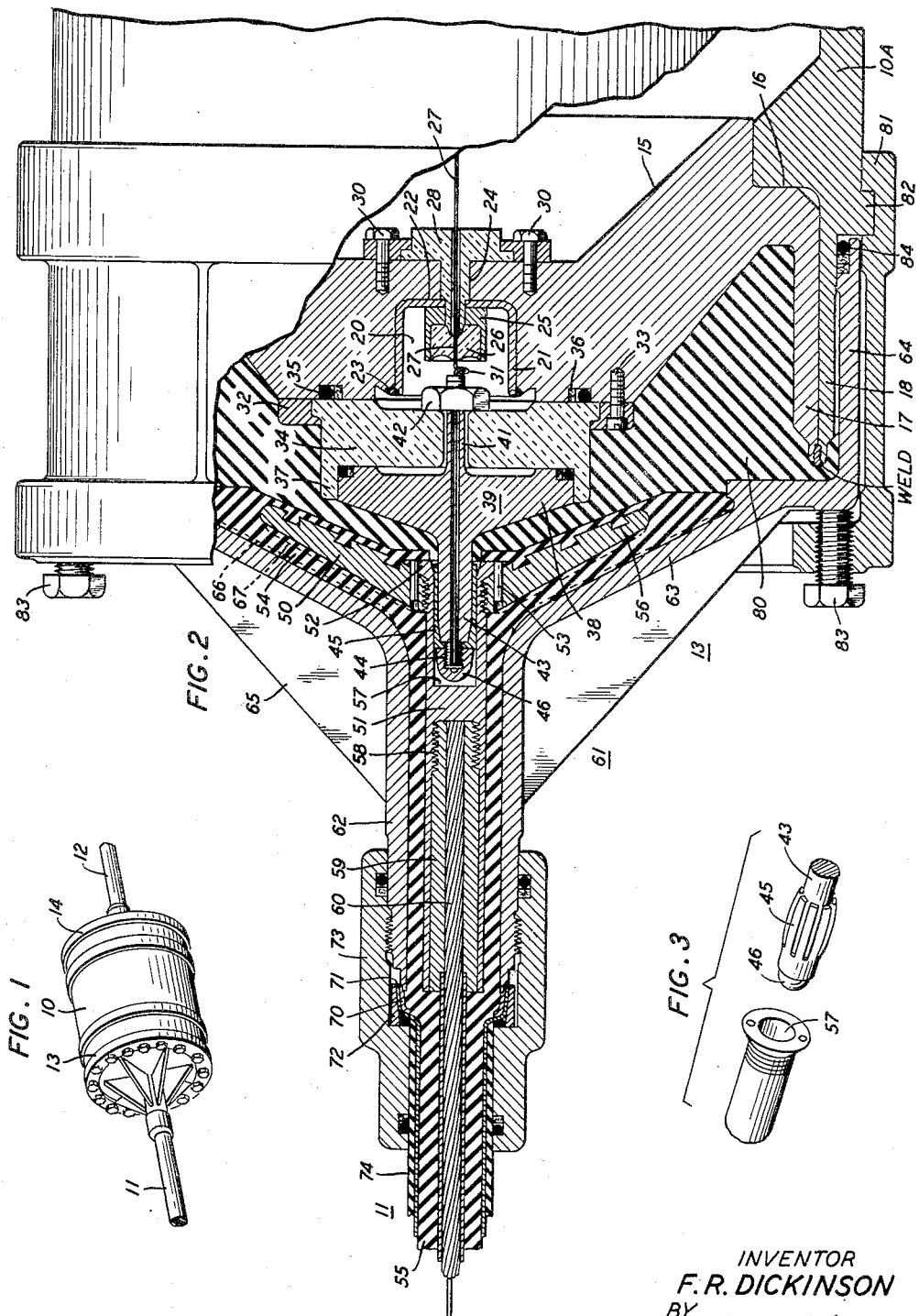

CABLE TERMINATION

Frank R. Dickinson, Glen Ridge, N. J., assignor to Bell Telephone Laboratories, Incorporated, New York, N. Y., a corporation of New York Application October 11, 1956, Serial No. 615,393

11 Claims. (Cl. 174—50.52)

This invention relates to electrical cables and housings for electrical instrumentalities and more particularly to means for sealably connecting a cable to a housing, both mechanically and electrically.

In one particular aspect this invention is concerned with a high-pressure, watertight connection between a so-called armorless coaxial submarine cable and an underwater repeater enclosed in a rigid housing of considerably greater diameter than the cable. An exemplary cable-to-housing diameter ratio is about 1:10.

The noted armorless cable is characterized by a core member of high tensile strength. For example, such a cable may comprise a stranded steel core about ¼ inch in diameter, sheathed in copper tape which is covered with about ⅜ inch of insulation. Another copper tape lies over the insulation, and the whole is enclosed in an outer insulating jacket about ⅛ inch thick. The insulation may advantageously be polyethylene. Suitable conducting tubes may be substituted for the copper tapes.

The repeater may be housed in a sealed metal cylinder about one foot in diameter and two or three feet long. In such an assembly the housing is the outer conductor, and the inner conductor extends sealably through end covers of the housing and is insulated therefrom. Advantageously, the inner conductor is located at the axis of the cylindrical housing.

Accordingly, an object of this invention is to facilitate the connection of an electric transmission cable to a housing containing electrical instrumentalities.

A more specific object is to devise structure to assure a watertight seal having adequate mechanical strength and electrical continuity between a cable having its principal tensile strength in its core, and a housing containing electrical apparatus.

An exemplary embodiment of this invention, which will subsequently be described in greater detail, comprises a sealed housing of an assemblage of electrical apparatus, a coaxial cable having a high tensile strength core, and an assembly for connecting the two together both mechanically and electrically.

The housing, which may be cylindrical, spherical, spheroidal, some hybridization of these shapes, or some other suitable shape, will be here considered for convenience of description as cylindrical. A repeater including suitable amplifying means, an equalizer comprising controllable attenuating devices, or other assemblage of electrical elements in a suitable container, is mounted in the housing with electrical connection to and through the housing.

The terms "repeater" or "repeater housing" will in general be herein used to designate an assemblage of electrical instrumentalities or a housing therefor. Such designations offer convenience of description and are not intended as limiting the invention.

A access or inner cover is sealed to the housing as by welding. The through electrical connection is insulated from the cover by a seal which may comprise a suitable coaxial arrangement of insulating material, such as glass or ceramic in a compatible metal. The outer end of this through conductor is electrically connected to a jack or plug element or equivalent pressure type contact or soldered connection which is secured to the access cover and insulated therefrom. The whole repeater assembly thus is a sealed unit.

The connecting assembly is secured to a cable such as that previously described and includes means for locking the assembly to the sealed housing to provide an additional seal and electrical connections. The heart of the connecting assembly is an anchor, which includes a stem portion comparable in diameter to the cable and a flared portion comparable in outer diameter to the housing. The anchor comprises a metal core and an enveloping body of insulation. Advantageously, the insulation is the same as that of the cable, e. g., polyethylene. The anchor is secured to the cable core and the insulation molded about the anchor and merged with the cable insulation. The stem portion of the anchor includes a plug or jack or equivalent connection passing through the insulation and mating with the jack or plug or equivalent mating electrical connection of the housing.

An outer cover for the housing fits over the anchor and the cable end and is isolated electrically therefrom by the insulating envelope and the cable insulation. This cover is secured to the housing with a locking ring having mechanism for pulling the cover up tight to the housing. A body of substantially incompressible but easily deformable material, e. g., rubber is placed between the outer and inner covers of the housing to aid in sealing this space. This body is of such size and shape that when the outer cover is pulled up tight, all voids in the space between the covers are filled. Increased pressure encountered in deep water tends to improve this outer seal.

Thus, one feature of this invention resides in an insulated anchor that transfers the tension load incident to cable handling from the core of the cable to the repeater housing, or vice versa, while maintaining the insulation integrity of the inner conductor.

Another feature involves an incompressible but easily deformable insert between the inner and outer covers of the housing, that assures complete sealing at high external pressure.

A further feature lies in a cable-to-instrumentalities housing connector integral with the cable, sealably attachable to the housing, but easily separable therefom if such separation is required.

With the novel arrangement of this invention, cable sections and repeaters or like devices may be separately transported and loaded on a cable-laying ship. Interconnection of these parts may be made on shipboard at a convenient time in accordance with the laying schedule. All of the cable sections and repeaters necessary for a continuous laying run will ordinarily be connected together before laying commences in order that electrical tests of the whole string may be made prior to and during the laying of this run.

Other and further objects and features of this invention will appear more fully and clearly from the following detailed description of an illustrative embodiment thereof, taken in connection with the appended drawing in which:

Fig. 1 is a representation of an instrument housing with sections of cable attached to each end in accordance with this invention;

Fig. 2 is a partially sectioned view of one end of the assembly of Fig. 1 showing details of a structure embodying this invention; and Fig. 3 is a detailed view of an electrical connector.

In Fig. 1 the instrument housing 10, e. g., a repeater housing, is connected into a cable as represented by the sections 11 and 12 by connector assemblies housed within and including the end sections 13 and 14. As shown in Fig. 2, the repeater housing 10 is represented by a small section 10a of one of its ends. The cable 11 is secured to the housing by means of a connector assembly or end seal generally designated as 13.

The repeater housing, which may be a cylinder of beryllium copper or equally strong, corrosion resistant material, is closed by inner or access covers of like material, the one in Fig. 2 being designated 15. The cover 15 is seated on a shoulder 16 of the housing and has an outwardly extending flange 17 fitting within a similar flange 18 on the end of the housing 10. The reduced ends of the flanges 17 and 18 are sealed together by welding or by any other suitable method.

A centrally located shouldered orifice 20 in the outer face of the access cover 15 contains a metal cup 21 seated on the shoulder 22 and having its rim welded or otherwise suitably sealed to the cover, as indicated at 23. The cup has an orifice in its bottom to match an opening 24 that extends from the cup to the inner face of the access cover. Sealed to the bottom of the cup 21, as by brazing, is a rigid seal comprising a metal cylinder 25 having an insulator such as glass or ceramic 26 fused within a recess thereof and around an electrical conductor 27 from the repeater. The metal cylinder 25 has a tapered orifice in which is seated the tip of an insulating bushing 28, a flange of which is secured to the inner face of the access cover as by bolts 30.

The conductor 27 passes from a suitable terminal or connector on the repeater through the bushing 28 and the rigid seal. The cup 21 and the cylinder 25 may be of a compatible alloy such as one called Kovar and comprising essentially 29 percent nickel, 17 percent cobalt, the remainder iron, having the property of sealability to a suitable material such as glass or ceramic which is used for the insulator 26. The conductor 27 may be coiled into an expansion section 31 before entering a connector to be subsequently described.

Secured to the face of the cover 15 by the clamping ring 32 and screws 33 is a pressure barrier member 34, which may be of an impervious ceramic material such as porcelain. The barrier member 34 is sealed to the cover 15 by means of a gasket, such as a rubber O ring 35, accompanied by a nonextrusion ring 36 of leather or a plastic material of similar characteristics. The barrier member 34 may also be sealed to the cover 15 by the fusion of the metallized surface of member 34 to cover 15 without the need of O rings.

The barrier member 34 has a flange 37 within which is seated a radial extension 38 of a connector 39 into which the conductor 27 is secured. A portion 41 of the connector 39, which passes through the barrier member 34, is secured thereto by a nut 42. The connector is sealed to the barrier by means of an O ring accompanied by a nonextrusion ring such as those previously described. On the side of the connector opposite the barrier is an extension 43 which forms part of a plug assembly for insertion in a jack included in the cable anchoring assembly to be subsequently described.

The conductor 27 passes through a central bore in the connector 39 and has its end secured, as by brazing or soldering, within the reduced end portion 44 of the connector extension 43. The plug assembly comprises the extension 43, a set of spring fingers 45, and a nut 46 threaded onto the reduced end portion 44 of the connector extension 43 to secure the spring fingers to this end portion. The spring fingers are shown as flattened between the connector extension and the jack in Fig. 2. Prior to assembly these fingers are bowed outward as shown in Fig. 3.

The assemblage of elements so far described in detail comprises a complete, sealed repeater unit to which the cable anchoring assembly may be expeditiously connected both mechanically and electrically.

The heart of the cable anchoring assembly is the anchor per se which comprises a metal core member and an enveloping jacket or sheath of insulating material. The core member includes the dish-shaped flange 50 into which a stem 51 is screwed. The stem 51 has a flared end 52 which seats in a tapered recess in the flange 50. Locking means, such as drive pins 53, passing through mating holes in the flange and the flared end of the stem prevent unscrewing and separation of the flange and stem. The jacket or sheath 54, advantageously of polyethylene, is molded onto the anchor and extends to and merges with the cable insulation 55 of like material. The flange 50 may be provided with dove-tailed recesses as at 56 to aid in securing the molded insulation thereto.

The end of the stem facing the repeater comprises a jack 57 to receive the spring encased plug assembly previously described. The other end of the stem fits over and is screw threaded at 58 to a sleeve 59 which is swaged to the core strands 60 of the cable. A cover, generally designated by 61, comprises a stem portion 62, a flared portion 63, a cylindrical flange 64, and strengthening ribs 65. The inside of the cover 61 and the contiguous face of the anchor flange 50 may be provided with radial ribs 66 and 67, respectively, for bedding in the insulating sheath 54 to prevent relative rotation between the cover and the anchor.

The outer conductor of the cable may be electrically bonded to the repeater housing in various ways, e. g., soldering, pressure connections, etc. One such pressure connection comprises a collar 70 of deformable metal, such as copper, which fits over the molded insulation of the anchor at its juncture with the cable insulation at the outer end of the stem 62. The tape or tapes 71 comprising the outer conductor of the cable lie over the collar 70 and are held in place by a second collar 72 and a gland nut 73 secured to the stem portion 62 of the cover 61. The gland nut 73 is sealed to the cover 61 and the outer insulating layer 74 of the cable by means of O rings and nonextrusion rings, such as previously described.

The structural relations of the parts associated with the anchor will be better understood from a brief description of one method for their assembly. The cable is prepared by stripping an end portion down to the steel core wires 60, leaving a short length of inner conducting tape protruding beyond the insulation. The outer insulation 74 is trimmed back somewhat further, and the outer conducting tape or tapes 71 are trimmed to conform to the collar 70.

The sleeve 59 is swaged to the strands 60 and the short protruding length of inner conductor tape. The stem 51 is screwed into the flange 50 and secured by the pins 53. The stem 51 of the anchor core is screwed onto the sleeve 59 after the collars 70 and 72 and the gland nut 73 have been applied to the cable and temporarily slid back out of the way.

The cover 61 is inserted in a mold, which at one end is secured around the inner layer of insulation of the cable. At the other end a mold cover is secured in spaced relation to the concave face of the anchor flange 50. The mold is then pressure filled with insulation, such as heated polyethylene. The insulation is forced against the cable insulation and merges with it. The mold is then removed, exposing the shoulder at the juncture of the anchor and the cable insulation. The collar 70 is placed over the shoulder of insulation. The tape 71 and the collar 72 are applied and are held in place by screwing the gland nut 73 onto the stem 62 of the cover 61.

If the end portion of the outer insulation 74 of the cable is damaged or is intentionally removed in the zone immediately adjacent the collars 70 and 72, it may be replaced by molding a new section prior to the placing of these collars and the gland nut 73.

Prior to applying the cover assembly to the housing 10, a body or blanket 80 of deformable but substantially incompressible material, such as rubber, is placed over the end assembly of the housing. The cover 61 is then fitted to the housing with the central plug, which protrudes through the body 80, and the jack means 57 mating. An O ring with nonextrusion rings seals the flange 64 of the outer cover to the flange 18 of the housing as at 84.

A clamping ring 81 having a bayonet connector for cooperating with lands 82 on the housing 10 is set in place and pulled up tightly by the cap screws 83. The configuration and the volume of the body 80 are such that taking up on the cap screws forces the rubber or like material into all voids between the inner and outer cover assemblies. To further insure a more perfect seal and fill minor voids all surfaces of the body 80 are coated with a viscous liquid insulation such as polyisobutylene.

The exemplary structure herein disclosed, by virtue of its inner rigid seal and outer deformable seal, and its assembly for mechanically connecting the high strength core of a cable to a repeater housing while keeping the core insulated from the housing, provides a high pressure, water-tight seal between the cable and the instrumentalities housing. Various modifications of this structure may be made without departing from the spirit and scope of this invention.

What is claimed is:

1. In combination a cable, a repeater, and means for connecting the cable to the repeater, said cable comprising an inner conductor including a high tensile strength load transmitting core and a high conductivity sheath thereover, a layer of insulation on said sheath, an outer conductor on said layer, and a protective insulating cover on the outer conductor; said repeater comprising a rigid housing of greater cross section than said cable, amplifying means within the housing, an inner cover sealed to the housing, and an electrical terminal insulated from and sealed through said cover; said means for connecting comprising a flared anchor secured to the cable core and including a continuous envelope of insulation compatible with the cable insulation and merged therewith, an outer cover in contact with a portion each of said anchor and said cable insulation, a body of substantially incompressible deformable insulating material between another portion of the anchor insulation and said inner cover, means for clamping the outer cover to the housing including means for applying sufficient pressure to the outer cover to cause said deformable material to fill all voids between the covers, means for connecting said inner conductor to said terminal, and means for connecting said outer conductor to said outer cover.

2. In combination an insulated cable, a repeater, and means for connecting the cable to the repeater, said cable comprising an inner conductor including a high tensile strength load transmitting core, said repeater comprising a rigid housing of greater cross section than said cable, an inner cover sealed to the housing, and an electrical terminal insulated from and sealed through said cover; said means for connecting comprising a flared anchor secured to the cable core and including a continuous envelope of insulation compatible with the cable insulation and merged therewith, an outer cover in contact with a portion each of said anchor and said cable insulation, a body of substantially incompressible deformable insulating material between said outer and said inner covers, means for clamping the outer cover to the housing including means for applying sufficient pressure to the deformable material to cause said material to fill all voids between the covers, and means for connecting said inner conductor to said terminal.

3. In combination a cable, a housing, and means for connecting the cable to the housing, said cable comprising an inner conductor including a high tensile strength load transmitting core, and insulation for the inner conductor; said housing enclosing electrical instrumentalities, an inner cover sealed to the housing and having an electrical terminal insulatively sealed therethrough, said means for connecting comprising a flared anchor secured to the cable core and including a continuous envelope of insulation compatible with and sealed to said cable insulation, an outer cover for the housing and enclosing the anchor, a body of substantially incompressible deformable insulating material between the anchor and the housing, means for securing the outer cover to the housing including means for applying pressure to the deformable material to force said material into all voids between said covers, and means for connecting said inner cable conductor to said terminal.

4. In combination a coaxial cable, a rigid repeater housing, said housing of a diameter of the order of ten times the cable diameter, and means for connecting the cable to the housing, said cable including a high tensile strength load transmitting core having insulation thereon, an inner cover sealed to the housing, said means for connecting comprising a flared anchor secured to the cable core and including a continuous envelope of insulation compatible with and sealed to said cable insulation, an outer cover for the housing and enclosing the anchor, a body of substantially incompressible deformable insulating material between the anchor and the housing, means for securing the outer cover to the housing including means for applying pressure to the deformable material to force said material into all voids between said covers.

5. In combination a coaxial cable, a repeater housing, and means for connecting the cable to the housing, said cable comprising an inner conductor including a high tensile strength load transmitting core, and insulation for the inner conductor; an inner cover sealed to the housing, said means for connecting comprising a flared anchor having a stem portion secured to the cable core and including a continuous envelope of insulation compatible with and sealed to said cable insulation, an outer cover for the housing and enclosing the anchor, a body of rubber-like material between the anchor and the housing, and means for securing the outer cover to the housing including means for applying pressure to the rubber-like material to force said material into all voids between said covers.

6. A submarine repeater and means for making connection between said repeater and a high tensile strength load transmitting core submarine cable, the repeater comprising amplifying means sealed in a cylindrical housing having an insulated electrical terminal at an end of its axis, said means for making connection comprising an anchor secured to the end of the cable core, said anchor including a flared portion, a stem portion, both of metal, and a continuous enveloping body of polyethylene; a metal cover for the housing, said cover comprising a cylindrical portion fitting over the cable and the stem of the anchor, and a flared portion fitting over the flared portion of the anchor, means for securing the cover to the housing, a mass of substantially incompressible but easily deformable material between the anchor and the housing, and means for making connection between an inner conductor of the cable and said electrical terminal on the housing.

7. A submarine repeater and means for making connection between said repeater and a submarine cable having a high tensile strength load transmitting core, the repeater comprising amplifying means sealed in a housing having an insulated electrical terminal thereon, said means for making connection comprising an anchor secured to the end of the cable core, said anchor including a flared portion, a stem portion, both of metal, and a continuous enveloping body of insulation; a metal cover for the repeater housing, said cover comprising a portion fitting over the cable and the stem of the anchor, and a flared portion fitting over the flared portion of the anchor, means for securing the cover to the housing, a mass of substantially incompressible but easily deformable material between the anchor and the housing, and means for making connection between an inner conductor of the cable and said electrical terminal on the housing.

8. A submersible housing for electrical devices and means for making connection between said housing and a high tensile strength load transmitting core submarine cable, said housing having an insulated electrical terminal thereon, said means for making connection comprising an anchor secured to the end of the cable core, said anchor including a flared portion, a stem portion, and a continuous enveloping body of insulation; a cover for the repeater housing, said cover comprising a portion fitting over the cable and the stem of the anchor, and a flared portion fitting over the flared portion of the anchor, means for securing the cover to the housing, and means for making connection between an inner conductor of the cable and said electrical terminal on the housing.

9. A submarine repeater and means for making connection between said repeater and a high tensile strength load transmitting core submarine cable, the repeater comprising amplifying means sealed in a cylindrical housing having an insulated electrical terminal, said means for making connection comprising an anchor secured to the end of the cable core, said anchor including a flared portion, a stem portion, both of metal, and a continuous enveloping body of insulation; a metal cover for the repeater housing, said cover comprising a cylindrical portion fitting over the cable and the stem of the anchor, and a flared portion fitting over the flared portion of the anchor, means for securing the cover to the housing, a mass of substantially incompressible but easily deformable material between the anchor and the housing, and means for making connection between an inner conductor of the cable and said electrical terminal.

10. Means for connecting a rigid sealed repeater housing to a coaxial cable having a high tensile strength load transmitting core of metal strands encased in a sheath of electrically conductive metal, that comprises a dish-shaped metal anchor completely enveloped in insulation and connected to said strands, a cover for said housing fitted over the end of the cable and the anchor, a body of deformable material between the housing and the anchor envelope, means for securing the cover to the housing and for forcing the deformable material into all of the space between the cover and the anchor, and means for making electrical connection between said electrically conductive sheath and the interior of the repeater housing.

11. Means for connecting a rigid sealed electrical instrument housing to a coaxial cable of substantially less cross section than the housing and having a high tensile strength load transmitting core of metal strands, that comprises a dish-shaped metal anchor completely enveloped in insulation and connected to said strands, a cover for said housing fitted over the end of the cable and the anchor, a body of deformable material between the housing and the anchor envelope, and means for securing the cover to the housing and for forcing the deformable material into all of the space between the cover and the anchor.

References Cited in the file of this patent
UNITED STATES PATENTS

| | | |
|---|---|---|
| 2,651,672 | Ivanoff | Sept. 8, 1953 |
| 2,676,197 | Read et al. | Apr. 20, 1954 |
| 2,697,739 | Presswell | Dec. 21, 1954 |